United States Patent [19]

Berger et al.

[11] 4,050,722

[45] * Sept. 27, 1977

[54] JOINT FOR CONDUIT

[75] Inventors: Sidney Berger, Great Neck; Salvatore Buda, East Hills; Burton Weintraub, Old Bethpage, all of N.Y.

[73] Assignee: Berger Industries, Inc., Maspeth, N.Y.

[ * ] Notice: The portion of the term of this patent subsequent to Oct. 5, 1993, has been disclaimed.

[21] Appl. No.: 621,834

[22] Filed: Oct. 14, 1975

[51] Int. Cl.² ............................................. F16L 19/00
[52] U.S. Cl. ..................................... 285/175; 285/321; 285/388
[58] Field of Search ............... 285/388, 387, 321, 175, 285/334.4, 393, DIG. 22, 276, 305

[56] References Cited

U.S. PATENT DOCUMENTS

| 459,910 | 9/1891 | Hogan | 285/388 |
|---|---|---|---|
| 738,503 | 9/1903 | Waters | 285/276 X |
| 1,119,752 | 12/1914 | Goethner et al. | 285/388 X |
| 1,703,696 | 2/1929 | Stratford | 285/388 X |
| 2,253,018 | 8/1941 | Cowles | 285/388 X |
| 2,310,490 | 2/1943 | Melsom | 285/276 |
| 2,383,692 | 8/1945 | Smith | 285/334.4 X |
| 2,390,445 | 12/1945 | Mercier | 285/321 X |
| 2,901,269 | 8/1959 | Rickard | 285/321 X |
| 3,434,745 | 3/1969 | Jackman | 285/321 X |
| 3,447,819 | 6/1969 | Borsum et al. | 285/321 X |
| 3,544,281 | 12/1970 | Phillips | 285/DIG. 22 |

FOREIGN PATENT DOCUMENTS

| 883,511 | 3/1943 | France | 285/393 |
|---|---|---|---|
| 714,600 | 9/1954 | United Kingdom | 285/321 |
| 755,118 | 8/1956 | United Kingdom | 285/388 |

Primary Examiner—Thomas F. Callaghan
Attorney, Agent, or Firm—Kirschstein, Kirschstein, Ottinger & Frank

[57] ABSTRACT

Each section of a conduit with a constant diameter axial passageway has male pipe threads formed on its outer wall surface at one end. A coupling sleeve is retained captively on the other end of the conduit section by a resilient lock ring means positioned partially in an annular lock ring groove disposed on the outer surface of the conduit section axially inwardly of the end face of the conduit section, i.e. — in a direction along the conduit section away from this end face, and partially in an annular lock ring groove disposed on the inner surface of the coupling sleeve. The lock ring means spans the two annular lock ring grooves to prevent the coupling sleeve from being pulled axially outwardly off the conduit section.

8 Claims, 8 Drawing Figures

JOINT FOR CONDUIT

BACKGROUND OF THE INVENTION

1. Field of the Invention

The invention relates to a joint for conduit of a wall thickness sufficient to permit threads to be formed therein, and, more particularly, to a joint wherein sections are assembled by using a coupling ring which will permit sections to swivel with respect to one another during coupling.

2. Prior Art

Until very recently, there were on the market only two kinds of steel conduit for electrical cables; one of these was called rigid pipe and the other was called light walled conduit.

The rigid pipe, a thick walled pipe, has been available for many years and conventially is used for the transmission of gas and water. It also is used for sheathing electric wires in buildings in which case it is frequently embedded in concrete. This type of pipe comes in various lengths, depending upon the trade but is essentially from ten feet to twenty feet long.

Rigid pipe sections are connected by screw couplings. Both ends of a pipe section have tapered male threads formed thereon. These threads are V-shaped to standardized dimensions having a slightly flattened crest and a slightly flattened base. Both ends of a screw coupling have tapered female pipe threads which mesh with the male pipe threads. The mesh is quite good and, because the threads are tapered, when they are joined they make a joint that is essentially hermetic, that is, a joint that does not require sealing agents such as mastic or pipe compound, although sealing agents may be used.

The difficulties associated with the use of rigid pipe become apparent when such pipe is to act as a conduit for electric cables. Because the pipe is thick walled, each section is highly priced. In addition, each section is difficult to handle because of its weight. Because both ends of the pipe are threaded, each section must be rotated in the field when it is connected to another length of pipe. The weight of the pipe section makes the rotation difficult.

Moreover, since the screw couplings must mesh with male threads on adjacent pipe sections, the sections must be in perfect axial alignment or the threads will not mesh properly. As is often the case in field installations, or where replacements must be made to existing pipe systems, the pipe sections are not in perfect alignment and problems result in assembling the sections.

The other kind of conduit which has been developed for sheathing electrical cables is light walled conduit. Light walled conduit was designed solely as a conduit for encasing electric cables to protect them from damage. Because it does not have to take large stresses, it is thin walled. Obviously, an advantage of light walled conduit is its lighter weight and its lower cost.

A disadvantage is that it cannot be used in instances where it might be subjected to heavy loads. In addition, because of its thin wall, this type of conduit can not be threaded. Compression couplings are used most often to join sections of light walled conduit. The ensuing joint cannot withstand substantial internal pressure or tensile stress. The advantage of compression couplings over the screw couplings used in conjunction with the rigid pipe is that if any section of tubing or any fitting is damaged, the coupling can be opened and the damaged pipe section or fitting can be pulled out transversely without removing the fittings or sections that were no damaged.

Recently, due to the scarcity of and resulting higher prices for steel, a medium walled pipe known as utility pipe or intermediate metal conduit was developed having a wall thickness less than the wall thickness of the rigid pipe but greater than the wall thickness of the light walled conduit. This intermediate metal conduit is heavy enough to take intensive loads and can be hermetically sealed at the joints.

Intermediate metal conduit has used screw couplings for joints, causing the same problems to arise in connection with this conduit as with the rigid pipe. Namely, the necessity of rotating conduit sections to make up joints. Further, the axial alignment problem inherent in the rigid pipe system is also present.

It is toward elimination of the foregoing and other difficulties that the present invention is directed.

SUMMARY OF THE INVENTION

1. Purposes of the Invention

It is an object of the prevent invention to provide a novel joint for conduit which can be threaded, providing a substantially hermetic connection between two sections of conduit.

Another object of the present invention is to provide a novel joint for conduit which can be threaded, in which the coupling is captively attached to the conduit section.

A further object of the present invention is to provide a novel joint for conduit which can be threaded, wherein the coupling permits some swiveling movement between lengths as they are joined.

Yet another object of the present invention is to provide a novel joint for conduit which can be threaded, which will permit shortening of lengths of conduit in the field for accommodation of existing spatial requirements.

Other objects of the invention in part will be obvious and in part will be apparent in the following description.

2. Brief Description of the Invention

Generally speaking, identical first and second conduit sections having axial passageways of constant dimensions and configuration are joined by means of a coupling sleeve. The sections are thick enough to be threaded and one end of each section is male threaded. The coupling sleeve is mounted captively on a non-threaded end of the first conduit section, being freely rotatable thereon. This end has a first annular lock ring groove in its outer wall surface which is spaced axially inwardly from the end face. The coupling sleeve has a first portion and a second portion at its opposite ends which define central openings of different diameters but which are in axial alignment. The first portion defines an opening having a diameter slightly greater than the outer wall surface of the conduit section. The second portion defines a central opening less than the outer diameter of the conduit section and has female threads formed therein. A second annular lock ring groove is formed on the inner surface of the first portion.

In one embodiment of the present invention a resilient lock ring means is located in the second annular lock ring groove. The second annular lock ring groove is dimensioned to be able to fully receive the resilient lock ring means therein. In its normally unbiased condition, the lock ring means partially projects from the second annular lock ring groove beyond the inner surface of the coupling sleeve. The first annular lock ring groove has a depth less than the cross-sectional height of the lock ring means. The end face of the first conduit section and the axially inward face of the lock ring means are so mutually formed, e.g., by the provision of a camming surface on one or both of them, that when the coupling sleeve with the lock ring means partially received in the second annular lock ring groove is forced axially inwardly along the non-threaded end of the first conduit section, the camming surface causes the lock ring means to be expanded and thereby be forced fully into the second annular lock ring groove. When the second annular lock ring groove and lock ring means are brought into radial alignment with the first annular lock ring groove, the lock ring means returns to its normal, unbiased condition and at this time rests partially in the first annular lock ring groove and partially in the second annular lock ring groove to retain captively the coupling sleeve on the end of the conduit section.

In an alternative embodiment, a resilient lock ring means is located within the first annular lock ring groove which is dimensioned to be able to receive, fully, the resilient lock ring means therein. In its normally unbiased condition the lock ring means partially projects from the first annular lock ring groove above the outer wall surface. The second annular lock ring groove has a depth less than the cross-sectional height of the lock ring means. The axially inward end face of the coupling sleeve and the axially outward surface of the lock ring means are so mutually formed, e.g., by the provision of a camming surface on one or both of them so that when the coupling sleeve is forced axially inwardly along the non-threaded end of the first conduit section the camming surface causes the lock ring means to be constricted and thereby forced fully into the first annular lock ring groove so that the first portion of the coupling sleeve can pass over the lock ring means. When the second annular lock ring groove is brought into radial alignment with the first annular lock ring groove and the lock ring means, the lock ring means returns to its normal unbiased condition and at this time rests partial in the first annular groove and partially in the second annular lock ring groove to retain captively the coupling sleeve on the end of the conduit section.

To assemble the conduit sections, the end of a conduit section having a coupling sleeve captively retained thereon is brought into axial alignment adjacent the threaded end of another conduit section. The coupling sleeve is then screwed onto the threaded end until the axially inward side of the second annular lock ring groove forces the lock ring means against the axially outward side of the first annular lock ring groove. The two end faces of the conduit sections are forced together under considerable stress to form a tight joint. A sealing means may be provided to insure that the joint will be leakproof.

The axially outward side of the first annular lock ring groove and the axially outward face of the lock ring means in the first embodiment of the present invention are so mutually formed that the application of a force tending to pull the coupling sleeve off the associated conduit section, i.e., an axially outwardly directed force, will not exert a radially outward expansive force on the lock ring means. Similarly, in the second embodiment, the axially inward side of the second annular lock ring groove and the axially inward side of the lock ring means are so mutually formed that the application of an axially outwardly directed force will not exert a radially inward constrictive force on the lock ring means.

Because of a slight clearance between the inner surface of the first portion of the coupling sleeve and the outer surface of the conduit section, two adjacent conduit sections may be slightly out of axial alignment without interfering with engagement between the coupling sleeve and the threaded end of the section on which it is to be screwed.

To disassemble previously assembled sections, consecutive coupling sleeves are unthreaded from the threaded ends of adjacent conduit sections permitting a section with its coupling sleeve captive thereon to be removed from a run of conduit.

The invention consists in the features of construction and arrangement of parts which will be detailed hereinafter and described in the appended claims.

BRIEF DESCRIPTION OF THE DRAWINGS

For a better understanding of the above invention reference should be had to the accompanying drawings wherein like numerals of reference indicate similar parts throughout the several views and wherein.

DESCRIPTION OF THE PREFERRED EMBODIMENT

Figure 1:
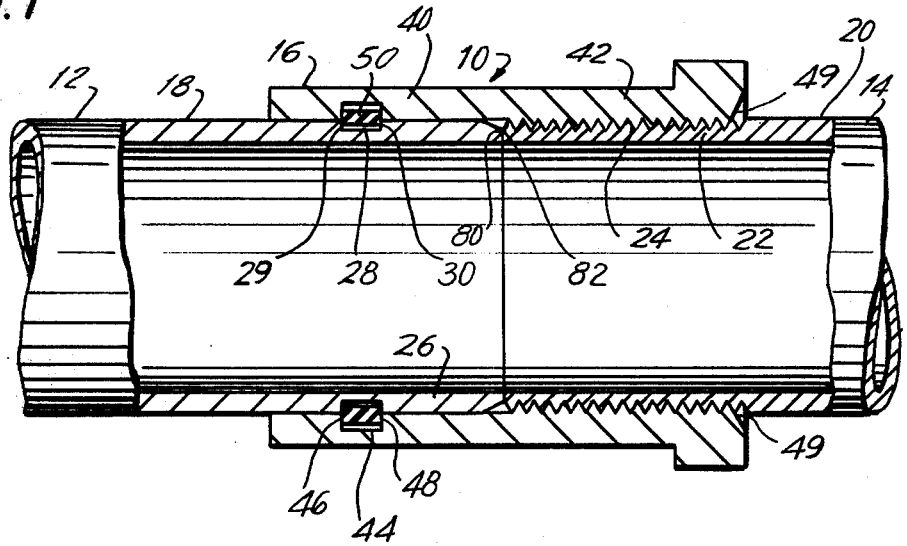
FIG. 1 is a sectional axial view of two assembled conduit sections embodying the present invention.

With reference to FIG. 1, a pipe joint for threadable conduit is identified generally by the reference numeral 10. It includes a first and a second conduit section 12 and 14, respectively, and a coupling sleeve 16 which is held captively on the end of section 12. The sections 12 and 14 are identical. The sections 12 and 14 have generally circular cylindrical outer wall surfaces 18 and 20, respectively, and each has an axial passage of constant dimensions and configuration therethrough. These sections typically are made of metal such as mild steel, wrought iron, a silicone bronze alloy or an aluminum alloy. As can be seen, the end portion 22 of the second section 14 has a tapered male pipe thread 24 formed in its outer wall surface 20. As used herein, the term "section" is defined to means a conduit of a length which is equal to at least four (4) time the outer or external diameter of the conduit. A typical section is from ten to twenty feet long.

While only a portion of each section of conduit is illustrated, it is to be understood that each section has one end on which is captively mounted a coupling sleeve in accordance with the present invention, and another end having male pipe threads formed therein.

In the specification and the claims, the term "axially inwardly" and "axially outwardly" are used with reference to the end face of the conduit section on which the coupling sleeve is retained, that is "axially inwardly" refers to a vector extending from that end face of the conduit section towards the other end face of the conduit section. Conversely, "axially outwardly" refers to a vector extending outwardly away from that end face.

In accordance with the present invention, the coupling sleeve 16 is free for rotation relative to the end 26 of the first conduit section 12; however, it is not permitted axial movement relative thereto as will be described hereinafter in detail. A first annular lock ring groove 28 is provided in the outer wall surface 18 and is spaced axially inwardly from the end face of the first conduit section. The first annular lock ring groove 28 has an axially inward side 29 and an axially outward side 30.

Figure 7:
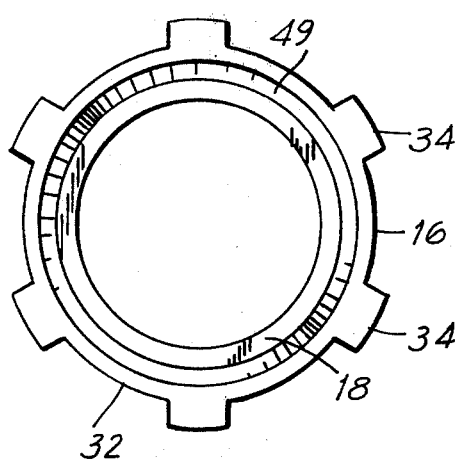
FIG. 7 is an end view of a conduit section at the end with the coupling sleeve mounted thereto.

The coupling sleeve 16 can be made of any suitable material such as steel, malleable iron, bronze, an aluminum alloy or a zinc die case allow. As shown in FIG. 7 the couping sleeve 16 may have an external circumference 32 which is formed into a shape that enables it to be gripped by a torquing tool (not shown) such as a pipe wrench. The coupling sleeve may have radially outwardly extending projections 34 which provide bearing surfaces for torquing tools. It is to be understood that the particular configuration of the external circumference which enables the coupling sleeve to be gripped by torquing tools is well known in the art and does not form a part of this invention.

With continued reference to FIG. 1, the coupling sleeve 16 has a first portion 40 at its axially inward end and a second portion 42 at its axially outward end which define central openings of different diameters that are in axial alignment. The first portion 40 defines an opening slightly greater in diameter than that of the outer wall surface 18. A second annular lock ring groove 44 is positioned in the inner surface of the first portion 40 and has an axially inward side 46 and an axially outward side 48. The second portion 42 defines a central opening which is less in diameter than the diameter of the outer wall surface 18 by an amount sufficient to permit threads to be formed therein. A female machine thread is formed in the second portion 42. The female machine thread is dimensioned to mesh initially with the male pipe threads 24; however, since the male thread is tapered and the female thread is not, when the threads are mated and tightened, they eventualy will jam. The axially outward edge 49 of the inner surface of the second portion 42 may be beveled to permit the threads to engage easily.

As mentioned hereinabove, the coupling sleeve 16 is held captively on the end 26 of the conduit section 12 and is permitted to rotate thereon. This is accomplished by a lock ring means positioned within the first and second annular lock ring grooves.

Figure 2:
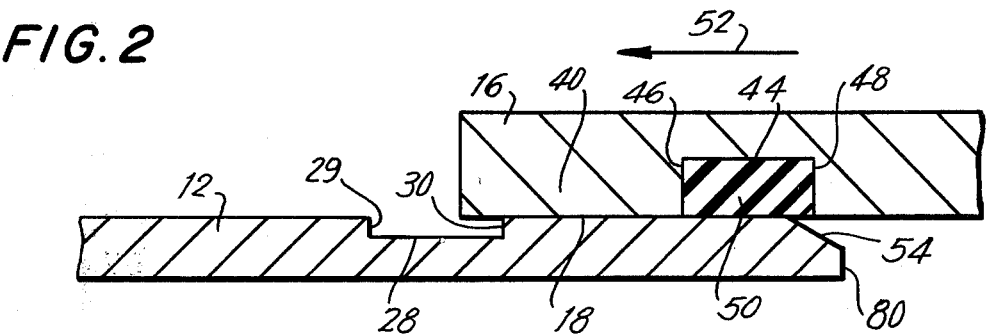
FIGS. 2 and 3 are highly enlarged fragmentary longitudinal sectional views showing sequential positions of the coupling sleeve and the lock ring means in one embodiment of the invention as the coupling sleeve is moved axially inwardly on the conduit section.
Figure 3:
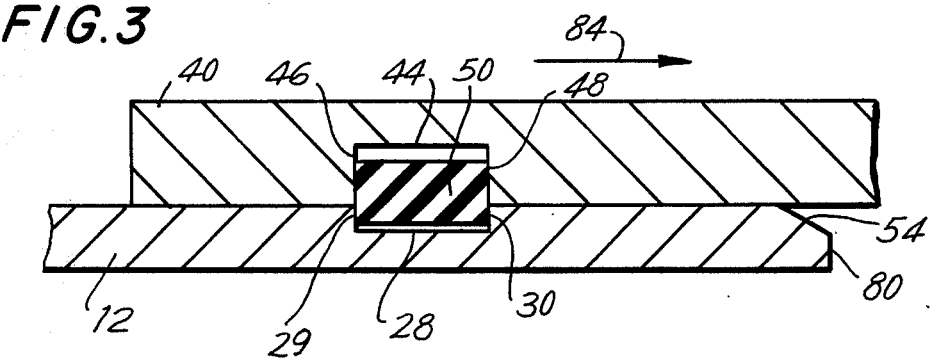

With reference to FIGS. 1, 2, and 3, there is shown one embodiment of the present invention wherein a resilient lock ring means is illustrated as a resilient split metal lock ring 50. The lock ring 50 is contained within the second annular lock ring groove 44 and can be fully received therein, and in its normal (unstressed) position extends beyond the inner wall surface of the first portion 40 for reasons which will become apparent as the description proceeds. The lock ring 50 is a split ring formed from a spring steel or other suitable resilient alloy which can be compressed to pass through the central openings in the coupling sleeve and snap into the groove 44. When the compressive force is removed, the ring will return to its normal configuration in which its outer diameter exceeds that of the central opening in the first portion 40 and its inner diameter is less than the diameter of the outer wall surface 18. The second annular lock ring groove 44 has a depth equal to at least the full cross-sectional height of the lock ring to allow the ring to be fully received in the groove when the ring is expanded. While the lock ring 50 is illustrated as being a ring with a rectangular cross-section, a ring of a circular cross-section or square cross-section also may be employed. If a ring of a circular cross-section is employed, it must extend beyond the inner surface of portion 40 at lease one half of its height so that is will not be force into the groove when the coupling sleeve is subjected to an axially outward force as will be described hereinafter.

In FIGS. 2 and 3 there is shown in sequential steps the cooperation of the end of the conduit section 12 with the lock ring 50 as the coupling sleeve 16 is mounted on the conduit section. When the coupling sleeve 16, having the lock ring 50 already positioned in the second lock ring groove 44, is first slipped onto the conduit section 12 in the direction of the arrow 52, the sloped edge 54 at the end of the conduit section 12 engages the lock ring 50. As mentioned hereinabove, the lock ring 50 can be forced outwardly or expanded into the second lock ring groove 44. As the couping sleeve 16 is moved further inwardly, the slope edge 54 acts as a camming surface and expands the lock ring 50 so as to be fully received into the second annular lock ring groove 44. The lock ring 50 is expanded into the groove 44 by the outer wall surface 18 as the coupling sleeve 16 and lock ring 50 advance thereon. When the second annular lock ring groove 44 is brought into radial alignment with the first annular lock ring groove 28, the lock ring 50 is no longer subject to the expansion force created by the outer surface of the conduit section and it contracts into the first annular lock ring groove 28 and returns to its normal position as shown in FIG. 3 whereby the lock ring bridges the space between the mouths of the opposed lock ring grooves. The coupling sleeve 16 is now captively retained on the conduit section 12.

The aforesaid radially outward expansive force exerted on the lock ring 50 has been described as being generated by the camming surface 54 at the end of the conduit section 12. The same effect is achieved by providing, alternatively, or additionally, a camming surface on the axially inward surface of the lock ring 50.

In this embodiment, the diameter of the bottom of the first annular lock ring groove 28 preferably is equal to or slightly smaller than the inside diameter of the annular lock ring 50 in its normal condition; the lock ring 50 preferably cannot be fully received into the first annular lock ring groove 28.

Figure 4:
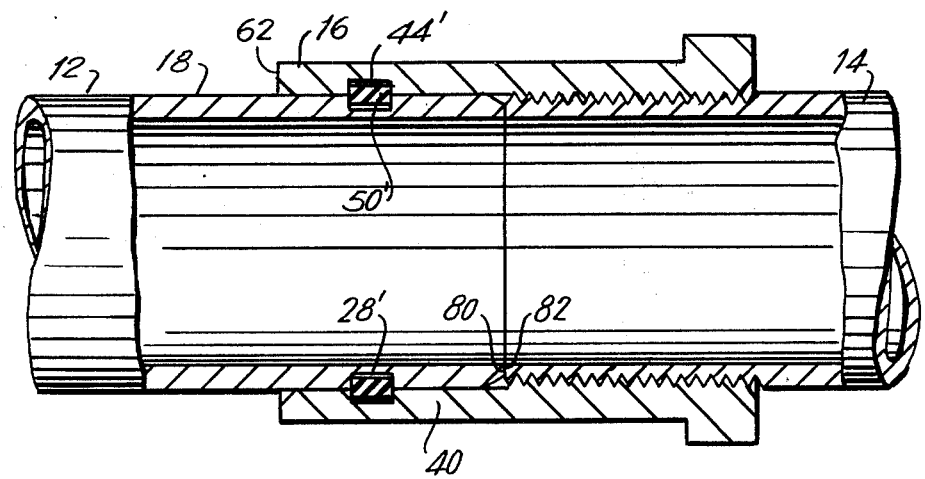
FIG. 4 is a sectional axial view of two assembled conduit sections embodying an alternative embodiment of the present invention.
Figure 5:
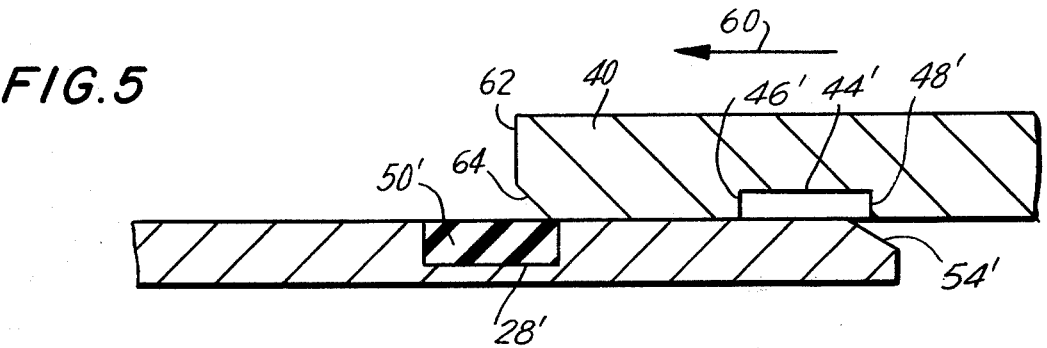
FIGS. 5 and 6 are views similar to FIGS. 2 and 3, but showing the alternative construction of FIG. 4.
Figure 6:
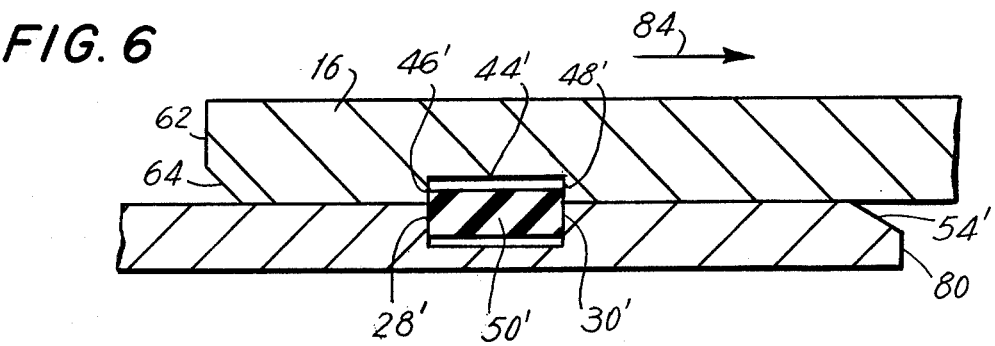

With reference to FIGS. 4, 5, and 6 there is shown a second embodiment of the present invention wherein a resilient split metal lock ring means 50' is positioned in the first annular lock ring groove 28' and in its normal (unstressed) position partially extends above the outer wall surface 18 for reasons which will become apparent as the description proceeds. The lock ring 50' is a split ring formed from a spring steel or other suitable resilient alloy as lock ring 50. The lock ring 50' can be expanded to slide over the end of the conduit section. The sloped edge 54' at the end of the first conduit section acts as a camming surface to aid in the expansion of the lock ring. The lock ring will snap into the first annular lock ring groove 28'. Thereupon, as the expanding force is removed, the ring will return to it normal configuration in which its inner diameter is less than the outside diameter of the conduit section 12 and exceeds the diameter of the bottom of the first annular lock ring groove 28' by an amount sufficient to allow the ring to be fully received in the groove when the ring is constricted.

FIGS. 5 and 6 show, in sequential steps the cooperation of the first portion 40 with the lock ring 50' as the coupling sleeve 16 is mounted on the conduit section 12. When the coupling sleeve 16 is first slipped onto the conduit section 12 in the direction of arrow 60 the first portion 40 clears that portion of the conduit section axially outwardly of the first annular lock ring groove 28'. The axially inward face 62 of the coupling sleeve 16 is provided with a camming surface 64 which engages the lock ring 50'. As mentioned hereinabove, the lock ring 50' can be forced inwardly or constricted fully into the first annular lock ring groove 28'. As the coupling sleeve 16 is moved further inwardly the camming surface 64 drives the lock ring 50' entirely into the first annular lock ring groove 28'. The lock ring is held in the groove by the inner surface of the first portion 40 as the coupling sleeve passes over the lock ring. Once the second annular lock ring groove 44' is in radial alignment with the first annular lock ring groove 28', the lock ring 50' expands into the second annular lock ring groove 44' and returns to its normal position as shown in FIG. 6 thereby captively retaining the coupling sleeve 16 on the conduit section 12 as the lock ring spans the space between the mouths of the opposed grooves.

The aforesaid radially inward constrictive force exerted on the lock ring 50' has been described as being generated by the camming surface 64 on the axially inward face 62 of the coupling sleeve 16. The same effect is achieved by providing, alternately, or additionally, a camming surface on the axially outward surface of the lock ring 50'.

The diameter of the bottom of the second annular lock ring groove 44', in this embodiment, preferably is equal to, or slightly greater than the outer diameter of the lock ring 50'; the lock ring 50' preferably cannot be fully received into the second annular lock ring groove.

While the lock ring 50' is illustrated as being of rectangular cross-section, a lock ring of square or circular cross-section may also be employed. If a lock ring of a circular cross-section is used, it must extend beyond the outer surface 18 at least one half its cross-sectional height so that it will not be forced into the first annular lock ring groove 28' when the coupling sleeve 16 is subjected to an axially outwardly directed force as described below.

To assemble the first and second conduit sections embodying the first embodiment mentioned, the first section 12 is brought into axial alignment with the second section 14. The coupling sleeve 16 is then threaded onto the end 22 until the axially inward side 46 of the second annular lock ring groove 44 engages the lock ring 50. The first conduit section 12 is thereby urged toward the second conduit section 16, its flat end face 80, which may be substantially perpendicular to the longitudinal axis of the conduit sections thereby advancing towards and eventually abutting the flat end face 82 of the second conduit section 16. The end face 82 may also be substantially perpendicular to the longitudinal axis of the conduit sections. The inner edges of the end faces 80, 82 may be slightly chamfered or beveled to remove burrs. As an effort is made to tighten the coupling sleeve 16 further along the end 22 an axially outwardly directed force 84 (shown in FIG. 3) is created. As the axially inward side 46 of the second annular lock ring groove 44 is forced against the lock ring 50, the lock ring 50 is pressed against the axially outward side 30 of the first annular lock ring groove 28. The lock ring 50 being of rectangular cross-section, or because it is projecting beyond the inner surface of the first portion 40 if of circular cross-section by at least one half its cross-sectional height, will not be cammed into the second annular lock ring groove 44. Instead, the force will be transmitted to the end face 80 of the conduit section 12, causing the end face to be squeezed against the juxtaposed end face 82 of the second conduit section 14.

The tapered male thread 24 is so dimensioned relative to the female thread of the second portion 42 that the threads start to jam but have not fully jammed when the desired squeezing pressure has been developed at the abutment between the juxtaposed pipe ends 80, 82. With the adjoining section thus coupled the axial passageways thereof are in axial alignment and, except for the insignificant groove formed by the end bevels, the inner surfaces of the sections present an unbroken surface to electric cable being threaded through a run of conduit so that cable can be pulled through a run without snagging at joints.

It will be appreciated that while the above discussion concerns itself with the joining of two conduit sections wherein the coupling sleeve is retained on the first conduit section in accordance with the first embodiment of the present invention mentioned above the discussion is equally applicable to the construction described in the alternative embodiment. In the alternative embodiment (FIG. 6) the force 84 will be transmitted to the end face 80 of the conduit section 12 because as the axially inward side 46' of the second annular lock ring groove 44' is forced against the lock ring 50', the lock ring 50' is pressed against the axially outward side 30' of the first annular lock ring groove 28'. The lock ring 50' being of rectangular cross-section or because it is projecting beyond the outer surface 18 of the first conduit section by at least one half of its cross-section height if of circular cross-section will not be cammed into the first annular lock ring groove 28'. Instead, the end face 80 will be squeezed against the juxtaposed end face 82 of the second conduit section.

When assembled conduit sections are to be disassembled the coupling sleeve 16 is unthreaded from the end 22 of the conduit section 14 and the conduit section 12 is backed away from the conduit section 14. Naturally, the joint at both ends of a given conduit section will have to be opened (disassembled) in order to remove the section from a run of conduit.

It will be appreciated from the foregoing that the lock ring means hereinabove described must be capable of withstanding very high shearing stresses. Testing has shown that the coupling sleeve and lock ring constructions in accordance with the embodiments of the present invention can withstand any axially outwardly directed force that can be developed by torquing the sleeve with conventional assembly tools.

Because a male pipe thread on the end of section 14 is mating with a female machine thread on the coupling 16, a substantially hermetic joint is formed between the coupling sleeve 16 and the second conduit section 14.

Figure 8:
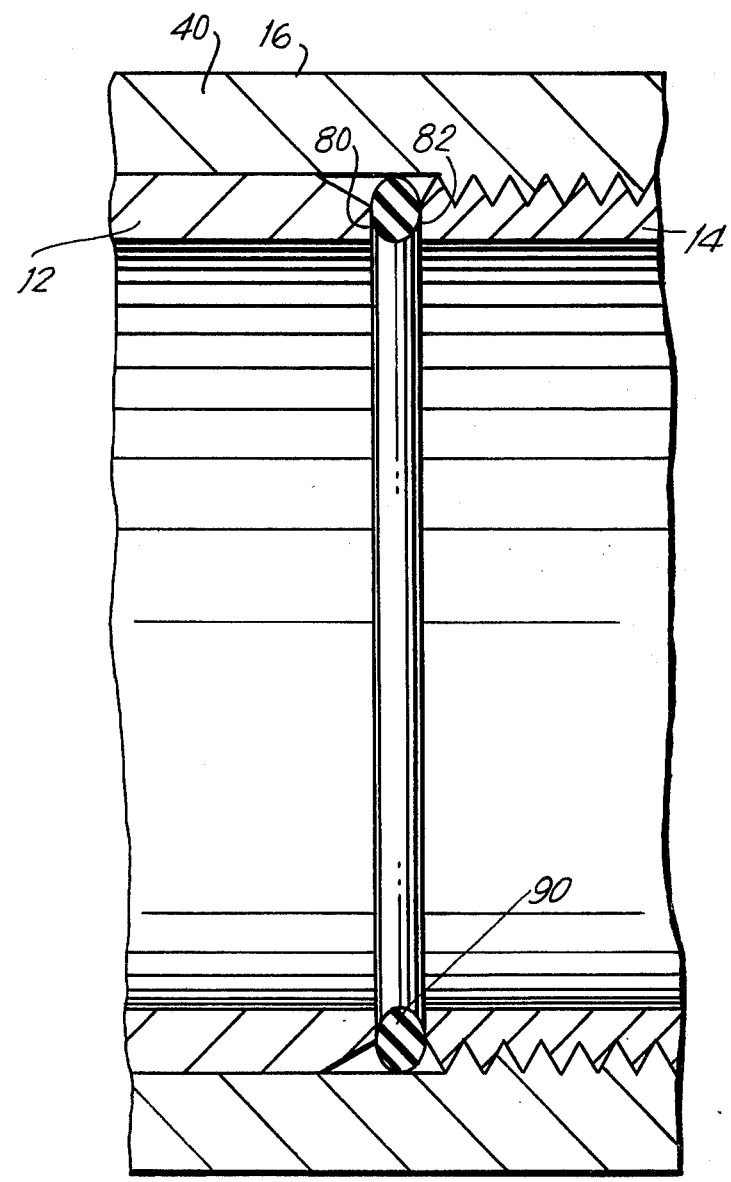
FIG. 8 is a highly enlarged sectional axial view of two assembled conduit sections provided with a seal.

While the joint described hereinabove is substantially hermetic additional sealing means may be optionally employed to insure raintightness. There is illustrated in FIG. 8 one such means. As elastomeric deformable sealing O-ring 90 is positioned immediately adjacent the flat end face 80 of the first conduit section 12. As the coupling sleeve 16 is advanced along the end of the conduit section 14 so that the end face 80 is urged against the end face 82 the sealing ring will be trapped there-between. This will prevent water from passing between the inner surface of the first portion 40 and the outer surface 18 of the first conduit section 12 and into the axial passageway.

It will be appreciated that other types of sealing means adapted to prevent leakage of water between the coupling sleeve and the outer surface of the first conduit section may be employed.

If, as is often the case in field installations, the sections to be joined are not in, or cannot be brought into, an axial alignment sufficiently good to join rigid pipe sections with a threaded coupling, the sections still may be joined with ease. The central opening formed by the first portion 40 is slightly greater than the outer wall surface 18 so that there are slight clearances of about 0.020 inch to 0.040 inch, on the diameter, between the portion 40 and the outer wall surface 18 of the conduit. This clearance permits a slight swivelling of the coupling sleeve 16 on the end of section 12 up to about ½° away from the longitudinal axis of the section. Therefore, the female thread on the coupling sleeve can mate readily with the male thread on the end of an adjoining conduit section even if the sections are not in exact axial alignment. The end faces of the sections will not abut each other initially in this situation, but they will abut after the coupling sleeve is tightened and the sections flex slightly to accommodate the abutment.

It can be seen from the foregoing detailed description that the object of the present invention, namely to create an improved joint for conduit which can be threaded has been achieved by a coupling sleeve captively retained on one end of a first conduit section. The coupling sleeve is retained captively by a lock ring means which, in its normal position spans a first and a second annular lock ring groove. The first annular lock ring groove is spaced axially inwardly from the end face of the conduit section. The second annular lock ring groove is positioned on the inner surface of a first portion of the coupling sleeve. The first portion defines a central opening slightly greater in diameter than the diameter of the outer wall surface of the conduit section. The coupling sleeve has, also, a second portion, axially outwardly of the first portion which defines a central opening in axial alignment with the central opening formed by the first portion, being smaller than the first by an amount sufficient to enable female threads to be formed therein which will mesh with the male threads formed on the adjacent section.

In one embodiment the annular lock ring groove in the coupling sleeve is dimensioned to receive, fully, the lock ring when the coupling sleeve is first slid over the end of the conduit section to which it is mounted. When the annular lock ring grooves are in radial alignment, the lock ring contracts into the normal position to span both annular lock ring grooves to thereby hold the coupling sleeve captively on the conduit section. The end face of the conduit section and the cooperating face of the lock ring may have cooperating camming surfaces. The axially inward face of the annular lock ring groove in the conduit section and the cooperating face of the lock ring have cooperating non-camming surfaces.

In an alternative embodiment the lock ring is constricted fully into the annular lock ring groove on the conduit section by the first portion of the coupling sleeve as the coupling sleeve is slid onto the conduit section. When both annular lock ring grooves are in radial alignment, the lock ring expands to its normal position being partially within both grooves to hold the coupling sleeve captively on the conduit section. The axially inward face of the coupling sleeve and the cooperating face of the lock ring may have cooperating camming surfaces. The axially inward face of the annular lock ring groove on the coupling sleeve and the cooperating face of the lock ring have cooperating non-camming surfaces.

To assemble two conduit sections, the end of a conduit section having external threads formed therein is placed in axial alignment adjacent the end of the first conduit section having a coupling sleeve thereon. The coupling sleeve is then screwed on to the threaded end portion until the axially inward side of the annular lock ring in the coupling sleeve presses against the lock ring in order to force the two ends of the conduit sections toward and eventually against one another.

To disassemble the conduit sections the coupling sleeve is unthreaded from the end of the adjacent conduit section. Obviously in a run of conduit, consecutive coupling sleeves must be unthreaded from the threaded ends of adjacent sections to permit the section with its coupling sleeve captively retained thereon to be removed.

While in accordance with the patent statutes, preferred and alternative embodiments of the present invention have been illustrated, and described in detail it is to be particularly understood that the invention is not limited thereto or thereby.

What is claimed is:
1. In combination:
a. a first two-ended conduit section having a length which equal to at least four times its outer diameter with a circular cylindrical outer wall surface of a constant diameter extending substantially the entire length of said conduit section and an axial passage of constant cross-sectional dimensions and configuration, one end of said first conduit section having external thread means thereon and a flat substantially perpendicular end face, the outside diameter of said thread means not exceeding said constant diameter, and said other end of said first conduit section being non-threaded and having a flat substantially perpendicular end face;
b. a second two-ended conduit section identical to said first conduit section having a length which is equal to at least four times its outer diameter, having a circular cylindrical outer wall surface of a constant diameter extending substantially the entire length of said conduit section, said outer wall surface equal in diameter to said outer wall surface of said first conduit section and an axial passage of constant cross-sectional dimensions and configuration equal to said axial passage through said first conduit section, one end of said second conduit section having external thread means thereon with a flat substantially perpendicular end face matching and abutting said adjacent flat substantially perpendicular end face of said other non-threaded end of said first conduit section, the outside diameter of said thread means not exceeding said constant diameter, and said other end of said second conduit sec- tion being non-threaded and having a flat substantially perpendicular end face;

c. a coupling sleeve having an end face and having first and second portions on opposite ends thereof, said first portion defining a central opening of a diameter slightly greater than the diameter of the entire length of said circular cylindrical outer wall surface so that said coupling sleeve may be slipped onto said first conduit section, said second portion defining a central opening of a diameter smaller than the diameter of said circular cylindrical outer wall surface and having female thread means formed therein extending from adjacent said end face and constructed and dimensioned to engage said external thread means on said one end of said second conduit section;

d. means providing an annular lock ring groove having an axially inward side and axially outward side in said outer wall surface of said first conduit section, near and spaced inwardly from said end face at said other, non-threaded end;

e. means providing an annular lock ring groove on the inner surface of said coupling sleeve in said first portion; and f. at least one resilient lock ring of a variable diameter received partially within each of said annular lock ring grooves in its unbiased condition, a said annular lock ring groove having a depth at least equal to the cross-sectional height of said at least one lock ring;

g. at least one of said first portion of said coupling sleeve and said other end of said first conduit section provided with camming means to urge said lock ring fully into said annular lock ring groove when said coupling sleeve is first moved axially inwardly on said first conduit section, said lock ring in its unbiased condition spanning said annular lock ring grooves thereby captively holding said coupling sleeve on said first conduit section to form a coupling sleeve and conduit section unit and permitting rotation of said coupling sleeve on said first conduit section so that said coupling sleeve can be threaded onto said end of said second conduit section so as through said lock ring to force said end faces of said first and second conduit sections together;

h. said central opening defined by said first portion being dimensioned to create a clearance between said first portion and said outer wall surface of said other non-threaded end of said first conduit section to thereby permit swivelling of said coupling sleeve on said non-threaded end of said first conduit section so that said female thread means on said coupling sleeve can mate with said external thread means on said other end of said second conduit section when said first and second conduit sections are not in exact axial alignment.

2. The combination in accordance with claim 1 wherein said annular lock ring groove on said coupling sleeve has a depth at least equal to the cross sectional height of said at least one lock ring.

3. The combination in accordance with claim 2 wherein said end of said first conduit section is provided with a camming means to expand said at least one lock ring means into said annular lock ring groove on said coupling sleeve when said coupling sleeve is moved axially inwardly on said first conduit section, said at least one lock ring returning to its unbiased condition when said annular lock ring grooves are in radial alignment.

4. The combination in accordance with claim 1 wherein said annular lock ring groove on said first conduit section has a depth at least equal to the cross sectional height of said at least one lock ring.

5. The combination in accordance with claim 4 wherein said first portion of said coupling sleeve is provided with a camming means to constrict said at least one lock ring into said annular lock ring groove on said first conduit section when said coupling sleeve is moved axially inwardly on said first conduit section, said at least one lock ring returning to its unbiased condition when said annular lock ring grooves are in radial alignment.

6. The combination in accordance with claim 1 wherein one of said thread means is a pipe thread and the other of said thread means is a machine thread, said thread means meshing to form an hermetic seal when said coupling sleeve is threaded on said end of said second conduit section.

7. The combination in accordance with claim 1 further including sealing means to prevent leakage of water into said axial passage when said end faces of said first and second conduit sections are forced together.

8. The combination in accordance with claim 7 wherein said sealing means comprises an elastomeric O-ring intermediate said end faces of said first and second conduit sections.

* * * * *